United States Patent [19]
Solmsdorf

[11] Patent Number: 6,082,778
[45] Date of Patent: *Jul. 4, 2000

[54] IDENTITY CARD PROTECTED FROM UNAUTHORIZED REPRODUCTION WITH A COPYING MACHINE

[75] Inventor: Bernhard Solmsdorf, Munich, Germany

[73] Assignee: Giesecke & Devrient GmbH, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/994,964

[22] Filed: Dec. 19, 1997

Related U.S. Application Data

[63] Continuation of application No. 08/409,520, Mar. 24, 1995, abandoned.

[30] Foreign Application Priority Data

Mar. 25, 1994 [DE] Germany ............... 44 10 431

[51] Int. Cl.$^7$ ..................................... B42D 15/00
[52] U.S. Cl. .................. 283/82; 283/85; 283/94; 283/107; 283/901
[58] Field of Search .................. 283/82, 85, 90, 283/91–94, 107–111, 901, 902, 904

[56] References Cited

U.S. PATENT DOCUMENTS

| | | | |
|---|---|---|---|
| 4,544,181 | 10/1985 | Maurer et al. | 283/74 |
| 4,663,518 | 5/1987 | Borror et al. | 283/85 X |
| 4,673,626 | 6/1987 | Takeda et al. . | |
| 4,765,656 | 8/1988 | Becker et al. | 283/70 |
| 4,766,026 | 8/1988 | Lass et al. | 283/94 |
| 4,894,110 | 1/1990 | Lass et al. . | |
| 5,005,872 | 4/1991 | Lass et al. | 283/85 |
| 5,298,922 | 3/1994 | Merkle et al. | 283/85 |
| 5,304,789 | 4/1994 | Lob et al. | 283/85 |
| 5,331,443 | 7/1994 | Stanisci | 283/86 X |

*Primary Examiner*—Andrea L. Pitts
*Assistant Examiner*—Monica Smith Carter
*Attorney, Agent, or Firm*—Reed Smith Hazel & Thomas LLP

[57] ABSTRACT

The invention relates to an identity card or similar data carrier having a copy protection element. The copy protection element contains a metal layer in which markings are incorporated with the aid of a laser beam by completely removing the metal layer in the area of the markings. The copy protection effect is produced by combining at least partial areas of an additional layer with the metal layer so that the marks are not electrophotographically reproducible, or not in accordance with the original, as such or in combination with the metal layer.

25 Claims, 3 Drawing Sheets

IDENTITY CARD PROTECTED FROM UNAUTHORIZED REPRODUCTION WITH A COPYING MACHINE

This application is a continuation under 37 C.F.R. § 1.53(b) of U.S. patent application No. 08/409,520, filed Mar. 24, 1995, now abandoned which is hereby incorporated in its entirety by reference.

BACKGROUND OF THE INVENTION

The present invention relates to an identity card or similar data carrier having a copy protection element provided in at least a partial area and containing a metal layer in which markings in the form of characters, patters or the like are incorporated with a laser beam.

Identity cards in the form of credit cards, bank cars, cash cards, authorization cards, identity cards, passport personalization pages or the like are used in a great variety of areas, including e.g. cashless money transfer, access control systems or various service systems. These identity cards generally have data relating to the card owner which are applied in the so-called personalization process. A widespread way of applying these data is to inscribe the data in the card by means of a laser beam.

The German Patent Application No. De-B 2 907 004 thus describes an identity card with two cover films and a card inlay in which the personalization or data can thus be incorporated on the card inlay in a last operation after completion of the card.

Since the quality of reproductions produced with modern copying machines has increased very greatly there is an increasing need to produce such identity cards or design them with features in such a way as to prevent reproduction of the personalization data or other data applied to the card.

The French Patent Application No. FR 2 565 268 has proposed for these purposes applying to documents a metallic background on which the information to be protected is printed. Such a metallic background causes direct reflection of the light rays falling on the metallic surface. The detector is usually disposed in a copying machine so that it can detect the light fractions diffusely backscattered by the original but not the light reflected into defined solid angle element. When reproduced by a copier metallic surfaces thus lead to a black surface on the copy instead of a metallically reflecting one.

U.S. Pat. No. 4,680,459 discloses a card to which a stripe is applied that is suitable for laser recording of information. This stripe has a metal layer in its interior in which microwriting or pictures are inscribed with the aid of a laser beam in the form of a dot pattern.

SUMMARY OF THE INVENTION

The problem of the invention is to propose an identity card which has high-quality markings such as characters, patterns, photos or the like, is provided with further developed protection from electrophotographic reproduction, is easy to produce and can be provided with markings in a last operation.

The solution to this problem is stated in the characterizing part of the main claim. Special embodiments and developments are the object of the subclaims.

The basic idea of the invention is to protect an identity card from electrophotographic reproduction by combining the copy protection effect from a thin metal layer with the physical, in particular optical, properties of a further layer whose interplay prevents the identity card from being reproduced, or reproduced in accordance with the original. For example, markings such as information, pictures, characters, patterns, logos or the like can be incorporated in a metal layer with the aid of a laser beam so that the markings exist in the form of a locally demetalized metal layer and the demetalized areas interact with parts of a further layer that substantially absorb or directly reflect incident radiation in such a way that they are well recognizable visually but cannot be electrophotographically reproduced, or not in accordance with the original.

Due to the abovementioned direct reflection of light rays falling on a metal layer the detector of a copying machine cannot pick up this radiation. The metal layer is therefore not reproduced correctly in terms of color and gloss, by color or black-and-white copying machines. Markings incorporated by removing the metal layer show high contrast with the metal layer and thus guarantee good readability, but the copy protection effect caused by the direct reflection of the metal layer is lost precisely at the places where the markings are. The special safeguarding effect consists in designing an area of material located under the marking, for example, so that it absorbs or directly reflects incident radiation of the visible spectral range and thus prevents copying of the markings. This can be obtained e.g. by making said areas of material black or metallically reflective.

It is irrelevant for an identity card according to the invention whether the removal of the metal layer, which can take place with the aid of a laser by melting, vaporizing or the like, exposes an absorbent or reflective layer located therebelow, or whether the partial areas of a further layer only acquire their absorbent property by being exposed to the laser. The only important thing is that, in addition to the metal-free areas, the abovementioned physical effects are present in parts of a layer located above or below the metal layer so as to exclude true reproduction, i.e. identical electrophotographic reproduction, of the card. The advantage of the inventive solution is that very high-quality, i.e. sharply contoured and very finely structured, markings can be produced due to the high-gloss, thin metal layer as an information layer. The inventive special feature of the second layer combined with the metal layer furthermore protects the markings from electrophotographic copying methods. The markings can preferably be incorporated with a laser beam in the finished card in a last operation, or in a transfer element that is then transferred to a finished card.

The inventive identity card thus offers optimal protection from reproduction with a copying machine since the metallic background and the incorporated markings cannot be reproduced in their optical interaction in accordance with the original. One can thus produce standard cards to be individualized and personalized by the particular card issuers. Since the personalization of the card usually takes place with a laser beam, no additional effort is furthermore necessary for providing the inventive identity card with the copy protection features.

If, for example, one inscribes a so-called negative semitone portrait in a black-base high-gloss metal layer by removing with the laser the areas of the metal layer which are dark in the original, one obtains a high-quality picture that appears as an uninterrupted black surface in a copy due to the described properties.

A further solution to the problem is to leave the metal layer intact and incorporate markings only in a transparent and thin layer located above the metal layer which completely cover the metal layer locally and are simultaneously absorbent for radiation of the visible spectral range. It is particularly suitable to blacken a layer sensitized to irradiation with a laser, such as a thin layer of transparent lacquer provided with additives.

Further advantages and special embodiments of the invention will result from the following examples which are explained with reference to the figures, whose representation is deliberately not true-to-scale in the interests of greater clarity.

DETAILED DESCRIPTION OF THE PREFERRED EMBODIMENTS

Figure 1:
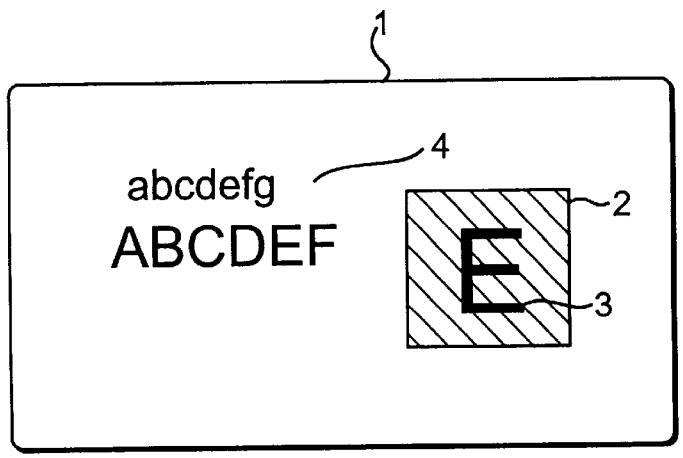
FIG. 1 shows an identity card according to a first embodiment of the present invention.

FIG. 1 shows schematically inventive identity card 1 provided with copy protection element 2 applied to the cover layer of the identity card by the transfer method. Marking 3, that is executed in the present case a letter "E", is incorporated in the metallic layer of the copy protection element with the aid of a laser beam. Furthermore the card can contain further, personal or nonpersonal, data 4 that can be applied by any suitable method.

The markings are preferably applied so that they form alphanumeric characters, logos, pictures, the photo of the owner, personal data or the like.

Figure 2:
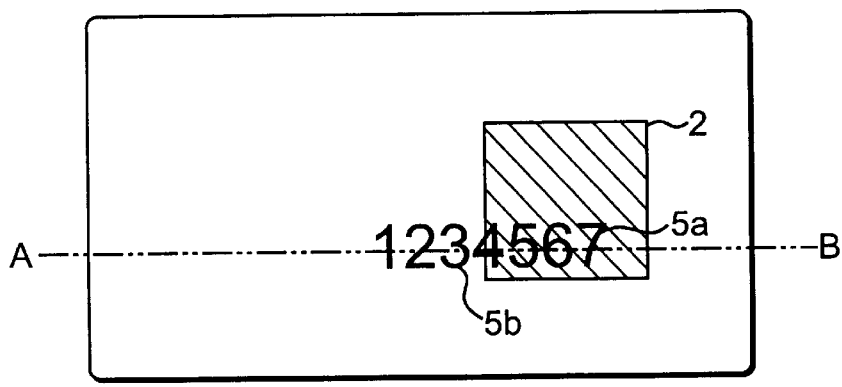
FIG. 2 shows a further embodiment of the identity card.

FIG. 2 shows identity card 1 having copy protection element 2 located under a transparent cover layer of the card. Card 1 was inscribed with a laser beam so that the markings, which exist here in the form of a digit string, continue from the copy protection element into the card. One can thus provide part of the signature, parts of the picture, parts of the data such as parts of the personalization data, for example, as copy-protected markings 5a in the copy protection element, while second part 5b of this information continues outside the copy protection element on the card. With this embodiment an additional optical safeguarding effect can be obtained by providing the markings with two backgrounds that have optically different effects. Marking area 5a can also have a different color design to area 5b, while both parts of the marking can still be applied with a laser in one operation. The lasering is preferable reduced in the area of the copy protection element so that the marking exists solely in the metal layer in this area.

Figure 3:
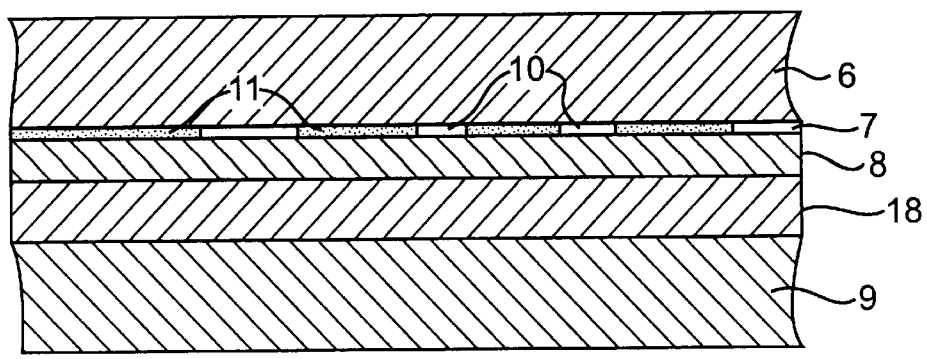
FIGS. 3 to 6 show sectional views of an identity card according to the present invention.

FIG. 3 shows a schematic cross section along cutting line A-B in FIG. 2 in the area of copy protection element 2. Under transparent card cover layer 6 there is metal layer 7 which is located above layer 8 having special optical properties. Layer 8 borders directly on card core layer 18 which is for example opaque, and is covered by transparent card cover layer 9 on the back.

With the aid of a laser beam markings 10 were incorporated in layer 7 by locally demetalizing the layer, thereby exposing layer 8, i.e. making it visible, in the area of the marks. The difference in contrast between the metal layer and layer 8 makes the marks easy to recognize by the eye. The local removal of the metal layer eliminates the copy protection effect in these areas; but this effect is restored by the special optical properties of layer 8.

In a first embodiment, layers suitable for this purpose are ones which absorb the radiation emitted by the copier so strongly that no sufficient reflected radiation coming from the places under the demetalized areas of the card passes into the detector of the copier, thereby preventing reproduction of the markings. The direct reflection of metalized areas 11 in combination with strongly absorbent layer 8 prevent the detector of the copier from detecting a difference in contrast between areas 10 and 11 so that the information completely disappears in the copy and the area of the card where the copy protection element is located is rendered in uniform black. In this connection it has proven particularly favorable to make layer 8 dark-colored, in particular black.

If metal layer 7 is glued during its production to back 9 of the card or layer 18 located thereabove, for example the printed core layer of the card, it has proved advantageous to execute layer 8 itself as a black adhesive layer.

In addition it is possible to compose layer 8 so that it contains fluorescent or phosphorescent substances which, when irradiated with the light of the copier, are not induced to emit light of a wavelength in the optically visible spectral range, i.e. whose excitation spectrum differs from the spectrum of the copier's illumination source. The luminescent substances should be selected so that the excitation nevertheless takes place in natural daylight. In this embodiment the improved copy protection arises from the false reproduction of the metallic background and the reproduction of the markings without their luminescent property in normal daylight. The effect is particularly advantageous if the luminescent substances are incorporated in a black layer.

In a further embodiment, layer 8 located below metallic layer 7 can be formed as a layer directly reflecting the incident radiation. A metallic layer is particularly suitable here if this second metal layer acts in optical contrast to the first. During an attempt to copy the identity card the incident beams are directly reflected both by layer 7 and by layer 8 so that no diffusely scattered radiation fractions can pass onto the detector of the copier and the copy protection element with the markings located thereon is rendered completely black. To avoid damage to the second metal layer during incorporation of the markings it has proven advantageous to separate the two layers by a transparent intermediate layer.

For both metallic layers one can fundamentally use all metals fusible with laser beams, such as Bi, Te, Ind, Cu, Al, Pt, Au, Ag, Ge, Si, Ga or alloys thereof. It plays no part within the framework of the invention whether the metal layer is vacuum evaporated, incorporated as film, transferred by the transfer method, or the identity card provided with the metal layer in some other way.

The optically reflective properties of layer 8 can also come from this layer containing lustrous pigments or iriodins that are preferably printed all-over or applied to the surface of the metal layer in another way. These substances cause direct reflection of incident light and simultaneously have a color effect dependent on the viewing angle.

Figure 4:
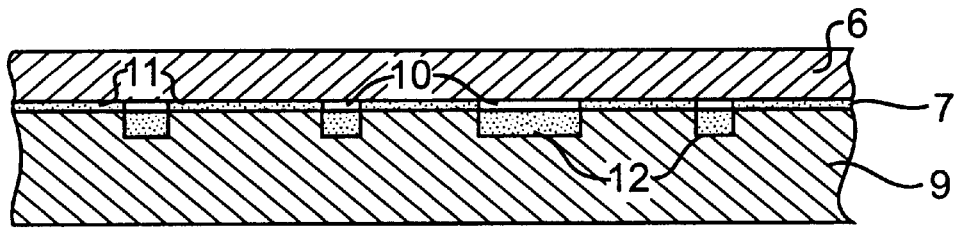

FIG. 4 shows schematically a detail of the cross section of a further identity card. Under transparent card cover layer 6 there is a metal layer 7 in which markings 10 were incorporated with the aid of a laser beam. During incorporation of the markings in the metal layer the laser beam was controlled so that the marks were transferred simultaneously into layer 9 therebelow. To obtain optimal results here it is usually necessary to sensitize layer 9 to laser radiation. For this purpose one can incorporate additives in layer 9, for example organic or inorganic pigments, colorants or other additives, that cause the laser beam to be more highly absorbed or cause coloring by irradiation with the laser. Special copy protection results again if the laser radiation and the additive in layer 9 are coordinated with each other so that when layer 7 is locally removed layer 9 therebelow is blackened in the form of the marking thereabove.

If the copy protection element is present only in partial areas of the card it has proven favorable to design layer 9 as a thin layer of lacquer provided with additives that covers a card core layer located therebelow (not shown). On the card core layer there can be general printed data on which can also be incorporated with the laser beam outside the copy protection element.

If the markings are incorporated by local removal of a metal layer and a black layer becomes visible therebelow, the markings stand out black in the demetalized areas from the surrounding reflective metal layer. When incorporating photos in an identity card it is therefore possible to control the laser beam so as to remove the metal layers that are dark in the master. In this way one obtains a positive image directly, while in the reverse case, i.e. removing the metal layer in the areas that are light in the original, one can transfer a negative portrait copy to the card. To obtain a special optical effect it is also readily possible to control the laser beam in various areas of the picture to be applied so as to create the optical impression of an alternating positive and negative image in different areas of the copy protection element.

In the abovementioned examples it is possible to provide the copy protection element completely in the interior of a card as long as the metal layer remains visible through an optically transparent cover layer. It is furthermore possible to apply the copy protection element according to one of the preceding embodiment examples to the surface of a one- or multilayer identity card. In both cases the copy protection element can either extend only over partial areas of the card or cover the total surface of the card, so that all information incorporated in a last operation is copy protected.

Figure 5:
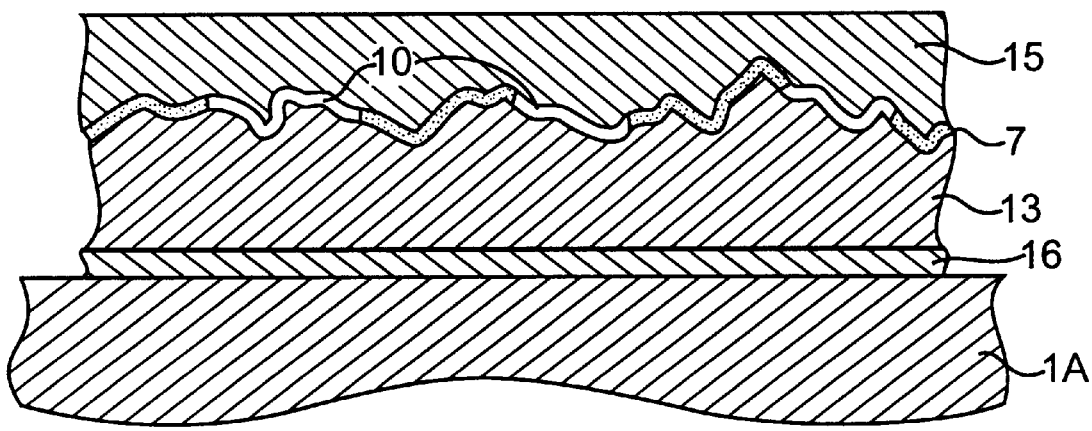

If the copy protection element is applied to the surface of an identity card it can also be designed as a transfer hologram in a special embodiment. FIG. 5 shows schematically a detail of the cross section of such an identity card. The transfer hologram is applied to the top surface of one- or multilayer identity card 1A with the aid of adhesive layer 16. The holographic structure is embossed into layer of lacquer 13 that is covered by metal layer 7 bearing the identical structure. To protect the transfer hologram from environmental influences the metal layer is usually covered by transparent protective layer 15. According to the invention the marking is incorporated by locally removing metal layer 7, and controlling the laser beam so that the hologram structure in layer 13 therebelow remains completely intact.

This procedure has the advantage that the hologram structure is completely retained even in the demetalized areas, on the one hand, while marking 10 can still be incorporated in the copy protection element, on the other hand. If layer 13 is designated so that it has one of the properties of above-described layer 8, this embodiment also obtains the inventively desired improved copy protection. On the one hand, the embossed holograph structure permits only a certain viewing angle of the hologram to be reproduced in the copy so that the angle-dependent effect is lost and, on the other hand, markings 10 are thus not reproducible in accordance with the original.

Figure 6:
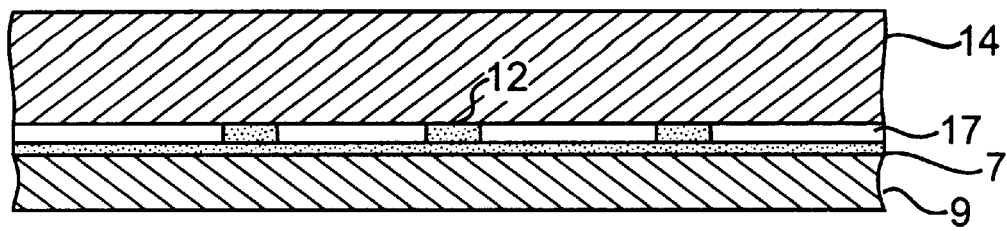

FIG. 6 shows a further embodiment of the inventive identity card. Under transparent cover layer 14 there is layer 17 sensitized to laser radiation in which markings 12 were incorporated with the aid of a laser beam, whereby the markings arise in particular by local blackening of layer 17. Uninterrupted metal layer 7 located therebelow is covered by second card cover layer 9. In this embodiment of the card the special copy protection effect also arises through the fact that metallic layer 7 is not electrophotographically reproducible in accordance with the original due to its direct reflection of incident radiation, while markings 12 stand out from layer 7 with good contrast. Due to the special properties of markings 12, which consist in the markings being black in the present case, an attempt to copy the card again produces a uniform black surface in the area of the copy protection element which no longer indicates the incorporated information. For layer 17 one preferably uses special materials on a plastic base that are sensitized to laser radiation, whereby thin layers of transparent lacquer provided with additives are particularly suitable.

Figure 7:
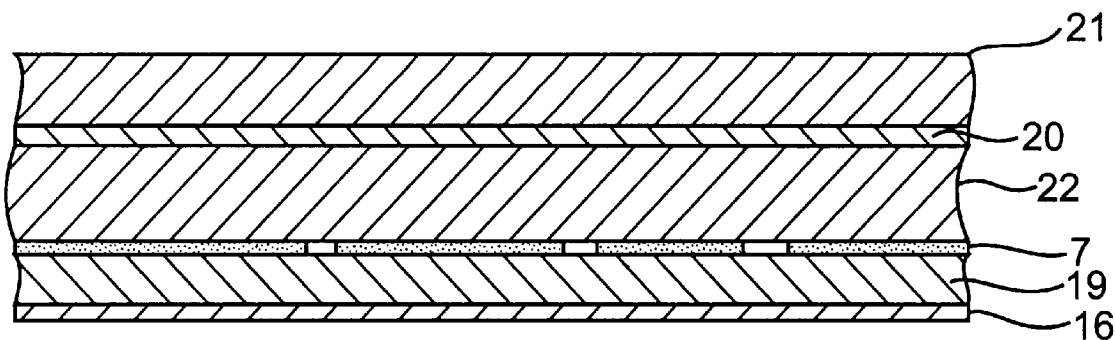
FIGS. 7 and 8 show sectional views through a transfer element.

According to the invention it is irrelevant whether the copy protection element is incorporated in the interior of the card during lamination thereof, or applied to the surface of the finished card by a transfer method. The transfer technique offers the advantage that any standard card can be, firstly, individualized and, secondly, protected from unauthorized reproduction with the aid of the additional copy protection element. A suitable transfer element for this purpose is shown in FIG. 7. On substrate layer 19 there is metal layer 7 that is covered by cover layer 22, release layer 20 and carrier layer 21. Such a transfer element can be transferred to a card under the action of heat and pressure, whereby release layer 20 and carrier layer 21 are removed from the transfer element, and substrate layer 19 of the transfer element connected firmly with the surface of the card with the aid of an adhesive. The adhesive can be applied directly to the parts of the card to which the transfer element is to be transferred. Or it can be already provided on the transfer element as separate adhesive layer 16 and be activated during the transfer operation. The transfer element is preferably part of a transfer band which bears the elements in an endless form or spaced apart. The inscription of the markings in the metal layer can take place after the transfer element has been transferred to the metal layer or directly on the transfer band, whereby in the latter case the transfer band is fed to a laser machining unit where the markings are incorporated on each individual transfer element. After the markings have been incorporated substrate layer 19 ensures that the information cannot be electrophotographically reproduced, or not in accordance with the original. For this purpose substrate layer 19 is designed as a layer that substantially absorbs incident radiation from outside, the layer being colored black in a preferred embodiment.

Figure 8:
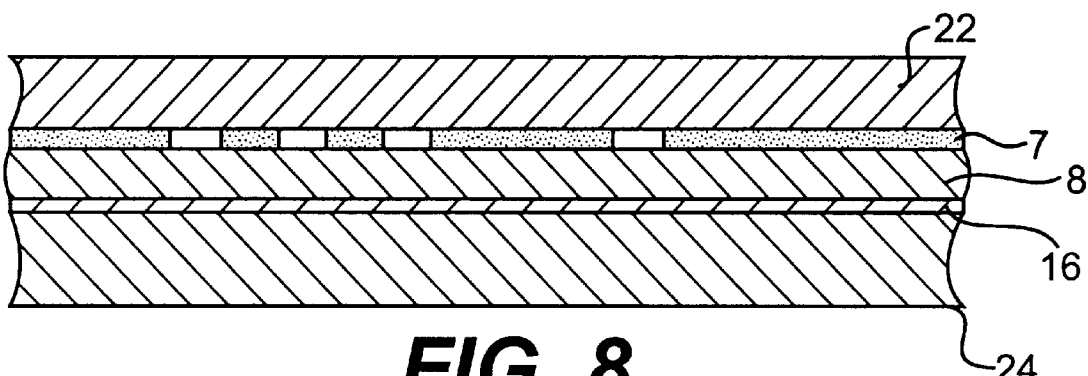

While the transfer element is preferably transferred to the card surface using a machine method according to FIG. 7, FIG. 8 shows a transfer element that is applied to carrier layer 24. The transfer element itself comprises adhesive layer 16, radiation-absorbent layer 8, metal layer 7 and cover layer 22 preferably designed as a covering lacquer layer. The transfer elements can again be spaced apart or provided continuously on carrier band 24. The transfer elements can be removed singly from the carrier foil by hand and transferred to the card. The markings can again be incorporated in the metal layer with the aid of a laser beam before or after transfer to the card, as described above.

Figure 9:
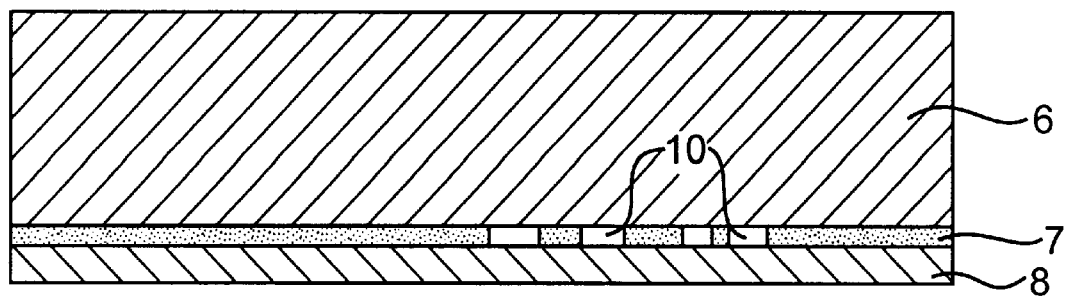
FIG. 9 shows a sectional view of an identity card according to the present invention.

FIG. 9 shows a further embodiment of the inventive card in cross section. The identity card is made substantially from transparent cover layer 6 covered on its back by thin reflective metal layer 7, and likewise thin, strongly absorbent layer 8. The cover layer can furthermore be provided with any desired design print on its surface or back, whereby one must make sure the print is designed so as to leave at least a so-called viewing window free to permit a free view of the copy protection element in the area where markings 10 are incorporated. The thickness of such a card is determined substantially by the thickness of layer 6, which can be between 0.5 and 1 mm depending on the selected material and purpose of the card.

In a modification of this embodiment one can dispense with applying layer 8, or apply any desired layer instead of absorbent layer 8, if the markings are not incorporated by removing reflective layer 7 but by blackening layer 6 located thereabove, as described above.

The metal layer is selected as thin as possible, whereby one must make sure it is at least thick enough so that the metal layer is no longer transparent. In this connection layer thicknesses of 0.05 to 1 micron have proven useful, whereby layer thicknesses from about 0.1 microns are preferably used for an aluminum layer. The pulse energy for such an aluminum layer is about 0.07 mJoule of a pulsed Nd:YAG laser, whose focus diameter is about 60 microns. This permits sufficient demetalizing of the layer in the focus at an energy density of about 2 joules/cm$^2$. It is clear that one can use other types of lasers with other energy values that must be adapted individually to the particular layer used and its thickness. For the inscription process one can also use in particular Nd:glass lasers with a wavelength of about 1 micron and $CO_2$ lasers with a wavelength of 10.6 microns. The only essential aspect when selecting the types of lasers and the parameters to be used is that the metal layer can be completely removed by exposure to the laser.

What is claimed is:

1. An identity card or data carrier having a copy protection element provided in at least a partial area, said copy protection element comprising:
   a first layer; and
   a metal layer formed on top of the first layer, wherein the metal layer includes markings formed by selective localized removal of the metal layer using a laser beam to expose parts of the first layer, said first layer being formed to at least one of absorb and directly reflect incident radiation of the visible spectral range passing through the markings of the metal layer in at least the exposed parts of the first layer which lie under the markings whereby electrophotographic reproduction of the markings is prevented.

2. The identity card of claim 1, wherein the metal layer is a high-gloss layer, and the first layer formed so as to absorb a substantial part of the radiation of the visible spectral range.

3. The identity card of claim 2, wherein the first layer is dark-colored.

4. The identity card of claim 2, wherein the first layer is black.

5. The identity card of claim 1, wherein the first layer is formed so as to directly reflect incident light.

6. The identity card of claim 5, wherein the first layer has a diffraction pattern, in particular a hologram structure.

7. The identity card of claim 5, wherein the first layer contains iriodins or lustrous pigments.

8. The identity card of claim 1, wherein the first layer comprises at least one interference layer.

9. The identity card of claim 5, wherein the first layer is a second metal layer formed to act in optical contrast to the first metal layer.

10. The identity card of claim 5, wherein the first layer is separated from the metal layer by a transparent intermediate layer.

11. The identity card of claim 1, wherein that first layer contains fluorescent or phosphorescent substances formed to have an excitation spectrum that differs from a spectrum of a copier's illumination source.

12. The identity card of claim 2, wherein the first layer is designed as a black adhesive layer.

13. The identity card of claim 1, wherein the first layer is blackened in the areas of the marking.

14. The identity card of claim 1, wherein the copy protection element is applied to a surface of the identity card or data carrier.

15. The identity card of claim 1, wherein the copy protection element is formed completely in an interior of the identity card or data carrier.

16. The identity card of claim 15, further comprising a transparent cover layer that has a thickness of more than 50% of the total thickness of the card.

17. The identity card of claim 2, wherein the markings form a semitone pattern reproduced from an original, dark areas of the original being rendered at least partly by a demetalizing of the metal layer.

18. The identity card of claim 17, wherein the dark areas of the original are rendered completely by demetalizing of the metal layer.

19. The identity card of claim 18, wherein the semitone pattern is a picture.

20. The identity card of claim 17, wherein the semitone pattern is formed using a grid method.

21. The identity card of claim 1, wherein the markings are formed to extend from the copy protection element into a surrounding area of said identity card.

22. The identity card of claim 1, comprising a transparent layer above the metal layer that has a thickness of 0.5 to 1 mm.

23. An identity card or data carrier having a copy protection element provided in at least a partial area, said copy protection element comprising:
   a metal layer; and
   a first layer formed on top of the metal layer, said first layer being sensitized to laser radiation, said first layer having markings incorporated thereinto with a laser beam, said markings are visible to the human eye and formed to absorb incident radiation of the visible spectral range, wherein the visible spectral radiation is absorbed by said markings while passing through unmarked portions of said first layer to said metal layer, whereby electrophotographic reproduction of the marks is prevented.

24. The identity card of claim 23, wherein the markings are black.

25. The identity card of claim 23, wherein the first layer has a thickness of 0.5 to 1 mm.

* * * * *